US011278989B2

(12) United States Patent
Rudolf et al.

(10) Patent No.: US 11,278,989 B2
(45) Date of Patent: Mar. 22, 2022

(54) HINGE LID CONTAINER WITH LID FLAP

(71) Applicant: PHILIP MORRIS PRODUCTS S.A., Neuchatel (CH)

(72) Inventors: David Rudolf, Kutna Hora (CZ); Poh Yoke Tritz, Yverdon-les-Bains (CH)

(73) Assignee: Philip Morris Products S.A., Neuchatel (CH)

( * ) Notice: Subject to any disclaimer, the term of this patent is extended or adjusted under 35 U.S.C. 154(b) by 267 days.

(21) Appl. No.: 15/536,003

(22) PCT Filed: Dec. 30, 2015

(86) PCT No.: PCT/EP2015/081419
§ 371 (c)(1),
(2) Date: Jun. 14, 2017

(87) PCT Pub. No.: WO2016/107902
PCT Pub. Date: Jul. 7, 2016

(65) Prior Publication Data
US 2017/0349363 A1    Dec. 7, 2017

(30) Foreign Application Priority Data

Dec. 31, 2014 (EP) .................................. 14200730

(51) Int. Cl.
*B23K 26/364* (2014.01)
*B65D 5/42* (2006.01)
(Continued)

(52) U.S. Cl.
CPC .......... *B23K 26/364* (2015.10); *B65D 5/4266* (2013.01); *B65D 85/1045* (2013.01);
(Continued)

(58) Field of Classification Search
CPC .............. B65D 85/1045; B65D 5/4266; B23K 26/364; B23K 2103/50; B23K 2103/00;
(Continued)

(56) References Cited

U.S. PATENT DOCUMENTS 4,386,926 A * 6/1983 Heller ..................... B29C 53/06
229/930
4,852,734 A * 8/1989 Allen ................... B65D 5/6691
206/273

(Continued)

FOREIGN PATENT DOCUMENTS

| CA | 2431772 | 6/2002 |
|----|---------|--------|
| CA | 2437936 | 8/2002 |

(Continued)

OTHER PUBLICATIONS

PCT Search Report and Written Opinion for PCT/EP2015/081419 dated Feb. 26, 2016 (11 pages).

(Continued)

*Primary Examiner* — Anthony D Stashick
*Assistant Examiner* — James M Van Buskirk
(74) *Attorney, Agent, or Firm* — Mueting Raasch Group

(57) ABSTRACT

A hinge lid container (10) for consumer articles comprises a box (12) and a hinge lid (14) connected to the box along a hinge line and pivotable about the hinge line between a closed position and an open position. The hinge lid comprises a first lid wall (16) and a lid flap (18) depending from the first lid wall along an edge fold line, the lid flap being folded inward towards the inner surface of the first lid wall. The container is at least partially formed from a blank having a thickness (T), the laminar blank defining an edge fold portion of the container connecting the first lid wall and the lid flap. The inner surface of the edge fold portion defines an ablation area (A) having a length in the longitudinal (Continued)

direction of the edge fold portion and a width (W) extending transversely to said length.

3 Claims, 2 Drawing Sheets

(51) Int. Cl.
*B65D 85/10* (2006.01)
*B23K 103/00* (2006.01)

(52) U.S. Cl.
CPC .... *B65D 85/10484* (2020.05); *B23K 2103/00* (2018.08); *B23K 2103/30* (2018.08); *B23K 2103/40* (2018.08); *B23K 2103/42* (2018.08); *B23K 2103/50* (2018.08)

(58) Field of Classification Search
CPC ............ B23K 2103/30; B23K 2103/42; B23K 2103/40
USPC ........................................................ 206/223
See application file for complete search history.

(56) References Cited

U.S. PATENT DOCUMENTS

| | | | | |
|---|---|---|---|---|
| 7,387,203 B2* | 6/2008 | Siecke | ............... | G11B 33/0444 |
| | | | | 206/312 |
| 10,315,823 B2* | 6/2019 | Murdick | ............ | B65D 75/5838 |
| 2005/0029131 A1* | 2/2005 | Draghetti | ........... | B65D 85/1045 |
| | | | | 206/259 |
| 2012/0152773 A1 | 6/2012 | Speith-Herfurth | | |
| 2013/0341380 A1* | 12/2013 | Tambo | ..................... | B65D 5/66 |
| | | | | 229/100 |

FOREIGN PATENT DOCUMENTS

| | | |
|---|---|---|
| CA | 2437938 | 7/2007 |
| CN | 1555329 | 12/2004 |
| CN | 102083709 | 1/2013 |
| CN | 104114452 | 6/2016 |
| EP | 2700583 | 8/2012 |
| EP | 2789547 | 10/2014 |
| WO | WO 02/47888 | 6/2002 |
| WO | WO 02/064452 | 8/2002 |
| WO | WO 2008/044190 | 4/2008 |
| WO | WO 2010/001335 | 1/2010 |
| WO | WO 2013/056336 | 4/2013 |

OTHER PUBLICATIONS

Office Action issued in China for Application No. 201580071616.0 dated Aug. 27, 2018 (15 pages). English translation included.
Office Action issued in Europe for Application No. 15817425.0 dated Sep. 21, 2018 (9 pages).
Office Action issued in Singapore for Application No. 11201705181Q dated Apr. 30, 2018.

* cited by examiner

HINGE LID CONTAINER WITH LID FLAP

This application is a U.S. National Stage Application of International Application No. PCT/EP2015/081419, filed Dec. 30, 2015, which was published in English on Jul. 7, 2016, as International Publication No. WO 206/107902 A1. International Application No. PCT/EP2015/081419 claims priority to European Application No. 14200730.1 filed Dec. 31, 2014.

The present invention relates to a container for consumer goods and to a blank for forming such container, which find particular application for holding consumer goods, such as smoking articles (for example, cigarettes).

Smoking articles such as cigarettes and cigars are typically packaged in rigid hinge-lid containers. These typically have a box part having a box front wall, a box rear wall, box side walls and a box base. They also usually have a lid part with a lid front wall, a lid rear wall, lid side walls and a lid top side. The lid part is typically hinged to the box part along a hinge line extending across a back wall of the container. The hinge line is usually provided as a pre-folded line, a crease line or a score line. The bundle of smoking articles housed in the box part is commonly wrapped in an inner liner, or inner package, of metallised paper, metal foil or other flexible sheet material. To access the bundle of smoking articles within the inner liner, a consumer should remove an upper portion of the inner liner upon first opening of the hinge-lid container.

For these containers, it is further known to round off or chamfer certain corners of the box and lid to give the container a distinctive appearance. This has typically been achieved in the past by providing lines of weakness, such as creasing lines or score lines, in the blank at the areas forming the edges of the container. These lines of weakness allow the blank to be folded in such a way that the corner does not sharply bend but instead progressively bends between two adjacent walls. One such container comprising a plurality of intended folded lines on the side parts of the side walls to enable correct folding thereof during formation of the container is known from WO 2010/001335.

In hinge-lid containers, the lid often further comprises a lid front flap extending from the lower edge of the lid front wall along a fold line. When the container is assembled from the blank, the lid front flap is folded inwards and typically secured to the inner surface of the lid front wall. This increases the stiffness of the lid, while at the same time improving the finish and appearance of the front of the container. Containers comprising one such lid front flap are known, for example, from WO 2010/001335 and EP 2789547.

In order to facilitate and guide the folding of blank to form a container of the type described above, a creasing line is thus provided at the lower edge of the lid front wall, whereby the lid flap can easily be folded inwards by approximately 180 degrees to lie against the inside of the lid front wall. To this purpose, a strip of laminar blank material is continuously fed to a machine provided with one or more creasing units adapted to produce local, linear depressions in the laminar material such that the flexural stability of the latter is reduced. Thus, the laminar blank material can conveniently be bent or folded along the creasing line(s) by a folding machine.

As an alternative, it has been proposed by WO 2008/044190 to provide in a blank for forming a container an intended fold line consisting of two parallel score lines by cutting or creasing the blank material, such that the parallel score lines are disposed closely adjacent a central ridge-like partition. One such blank may be folded to form an angle of about 90 degrees or more across the intended fold.

In particular, the score lines are formed on the inner side of the blank, such that the weakening is only faintly perceptible from the outside. WO 2008/044190 discloses that the spacing between the score lines is dependent on the type of blank material and must be individually determined. However, the centre-to-centre distance between the two parallel score lines is preferably between 1 and 3 times the thickness of the blank material.

However, the creasing operation can add complexity to the manufacturing process. This represents a drawback in particular where several other lines of weakness need to be formed in the blank, such as the ones for forming bevelled or rounded corners of the containers. Accordingly, it would be desirable to provide an improved container and blank that may be conveniently formed and assembled in a more straightforward and cost-effective manner. Further, it would be desirable to provide an improved container and blank the manufacture of which can easily be combined with the provision of lines of weakness, such as score lines, in the blank, such that the overall production and assembly process is simplified and made more flexible. At the same time, it would be desirable to provide a container for consumer goods that that has an improved look and provides the consumer with a smoother feel.

According to a first aspect of the present invention, there is provided a hinge lid container for consumer articles comprising a box and a hinge lid, the hinge lid being connected to the box along a hinge line and pivotable about the hinge line between a closed position and an open position. The hinge lid comprises a first lid wall and a lid flap depending from the first lid wall along an edge fold line, the lid flap being folded inward towards the inner surface of the first lid wall. The container is at least partially formed from a blank having a thickness (T), the laminar blank defining an edge fold portion of the container connecting the first lid wall and the lid flap. The inner surface of the edge fold portion defines an ablation area (A) having a length in the longitudinal direction of the edge fold portion and a width (W) extending transversely to said length. The ablation area (A) ablation area (A) comprises one or more ablated zones having a residual thickness that is less than about 50 percent of the thickness (T) of the laminar blank and wherein the one or more ablated zones have a combined width of at least about 1.5 times the thickness (T) of the laminar blank.

According to a second aspect of the present invention, there is provided a laminar blank for forming a container for consumer articles. The blank has a thickness (T) and comprises a box-defining blank portion for forming a box portion of the container and a lid-defining blank portion for forming a lid portion of the container. The lid-defining blank portion comprises a lid front wall panel for forming a front wall of the lid and a lid flap panel depending from the lid front wall panel along an edge fold line. The laminar blank defines an edge fold portion connecting the lid front wall panel and the lid flap panel. One surface of the edge fold portion defines an ablation area (A) having a length in the longitudinal direction of the edge fold portion and a width (W) extending transversely to said length. The ablation area (A) one or more ablated zones having a residual thickness that is less than about 50 percent of the thickness (T) of the laminar blank and wherein the one or more ablated zones have a combined width of at least about 1.5 times the thickness (T) of the laminar blank.

According to a third aspect of the present invention, there is provided a container for consumer articles comprising a first wall and second wall depending from the first wall along an edge fold portion. The first wall is folded about the edge fold portion towards the inner surface of the second wall by an angle greater than 90 degrees. The container is at least partially formed from a laminar blank having a thickness (T), the laminar blank defining an edge fold portion of the container hingedly connecting the wall and the flap. The inner surface of the edge fold portion defines an ablation area (A) having a length in the longitudinal direction of the edge fold portion and a width (W) extending transversely to said length. The ablation area (A) comprises one or more ablated zones having a residual thickness that is less than about 50 percent of the thickness (T) of the laminar blank and wherein the one or more ablated zones have a combined width of at least about 1.5 times the thickness (T) of the laminar blank.

It shall be appreciated that any features described with reference to one aspect of the present invention are equally applicable to any other aspect of the invention.

The present invention provides a hinge lid container for consumer goods, wherein the lid comprises a wall and a flap depending from said wall and folded inwards to lie substantially against the inner surface of said wall. By way of example, this is the case of a hinge lid container for consumer goods, wherein the lid comprises a flap depending from the front wall and which is folded inwards to increase the stiffness of the front of the lid, while at the same time improving the finish and appearance of the front of the container as a whole. However, this may apply to any other flap depending from a planar wall of a container, wherein the flap and the planar wall are formed from adjacent panels of the same blank and originally lie in the same plane, and wherein, during assembly of the container from the blank, the blank panel for forming the flap is folded by an angle greater than 90 degrees towards the blank panel for forming the planar wall.

As used herein, the terms "front", "back", "upper", "lower", "top", "bottom" and "side", refer to the relative positions of portions of containers according to the invention and components thereof when the container is in an upright position with the lid of the outer housing in the closed position and the hinge line at the back of the container. When describing containers according to the present invention, these terms are used irrespective of the orientation of the container being described. The back wall of the container is the wall comprising the hinge line.

The term "inner surface" is used throughout the specification to refer to the surface of a component of the assembled container that is facing towards the interior of the container, for example towards the consumer goods, when the container is in the closed position. The term "outer surface" is used throughout the specification to refer to the surface of a component of the container that is facing towards the exterior of the container. It should be noted that the inside or outside surface is not necessarily equivalent to a certain side of a blank used in assembly of the container. Depending on how the blank is folded around the consumer goods, areas that are on the same side of the blank can either face towards the inside or the towards the outside of the container.

The term "hinge line" refers in particular to a line about which the lid may be pivoted in order to open the container. A hinge line may be, for example, a pre-folded fold line or a score line in the panel forming the back wall of the container.

The term "ablation area" is used herein to refer to the minimum area of the blank that encloses all ablated zones in the edge fold portion.

The term "ablated zone" is used herein to refer to an area of the edge fold portion from which material has been ablated (e.g. removed by means of a laser beam or a blade) from a surface of the laminar blank or container. Accordingly, the residual thickness of an ablated zone is less than the thickness (T) of the laminar blank. Preferably, an ablated zone is provided as a groove within the blank. This may be formed with a linear ablation tool, such as a laser or a blade. In embodiments where all the ablated zones are defined by parallel grooves within the blank, the area of the ablation area may be regarded as the area enclosing all the grooves on the edge fold portion. Thus, in those embodiments, the width of the ablation area may be regarded as extending transversely to the grooves, from the first to the last of the grooves on the edge fold portion. In general, the expression "length of the edge fold portion" is used to describe how the edge fold portion extends longitudinally along the edge fold line about which the flap depends from the first wall. The expression "width of the edge fold portion" is used to describe how the edge fold portion extends transversely to the length.

The expression "folded by an angle greater than 90 degrees" is used throughout the present specification to describe a first element of a container or blank according to the invention, the first element being, during assembly of the container, folded towards the inner surface of a second element of the container. This expression shall be construed as referring to an original state wherein the blank is substantially flat and so the first element and the second element of the blank are coplanar and a first surface of the first element and the inner surface of the second element are on the same side of the blank. During assembly of the container, the first element is folded towards the second element so as to substantially pivot about an edge fold portion such that the first surface of the first element forms, with the inner surface of the second element, an angle less than 90 degrees.

In contrast to known containers of this type, according to the present invention containers are formed from a laminar blank that comprises, over an ablation area defining the edge fold between the planar wall and the flap depending from the planar wall, one or more ablated zones. In the ablated zones, the thickness of the laminar blank is reduced by removal (for example, by laser ablation) of part of the blank material, such that the residual thickness in the ablated zones is less than about 50 percent of the thickness (T) of the laminar blank and the combined width of the ablated zones is at least about 1.5 times the thickness (T) of the laminar blank.

The Applicant has surprisingly found that this advantageously reduces the force required for folding the flap when assembling the container from the blank. Accordingly, the process for forming a container from its blank can be simplified. Further, because the edge fold line can be formed by removing material from the blank, for example by laser ablation, the manufacturing process of the container is also advantageously made more flexible.

When the container is assembled from the blank, the edge fold portion shall be, to an extent, deformed as the blank is folded to bring the flap towards the inner surface of the first wall. However, the skilled person shall appreciate that this shall not substantially alter what is meant by "length and width of the edge fold portion", by "length and width of the ablation area" or by "width of an ablated zone" provided on the inner surface of the edge fold portion, since for the measurement thereof reference can always be made to the planar blank from which the container has been formed.

The term "residual thickness" is used herein to refer to the minimum distance measured between two opposite surfaces of the laminar blank or of a wall of the container formed from the blank. In practice, the distance at a given location is measured along a direction locally perpendicular to the opposite surfaces. The "residual thickness" of an ablated zone may be constant over the ablated zone if material is removed homogenously substantially all over the ablated zone (flat profile). Alternatively, the residual thickness of the ablated zone may vary across a width of the ablated zone, if material is removed non-homogeneously over the ablated zone (e.g. V-shaped, U-shaped grooves).

The term "spring-back force" is a known term of art for referring to a particular property of a laminar blank. It is sometimes referred to as 'the crease recovery' and means the force (N) required to hold a scored sample that is folded at 90 degrees for a 15-second period. The measurement is made at the end of the 15-second period. The spring-back force of a portion of a laminar blank can be measured using a known PIRA Crease and Board Stiffness Tester (commercially available for example from Messmer and Buchel, UK). As is known in the art, to measure the spring-back force of a curved edge portion of a container, a sample of the portion to be tested should first be removed from the laminar blank. As shown in FIG. 1, for round corner packs, for the purposes of the present invention the spring-back force of a pack is assessed using a sample measuring 38±1 millimetres by 38±0.5 millimetres, with the corner forming portion being positioned 21±0.5 millimetres from one side of the blank (see also FIG. 2). The blank should be conditioned at 22 degrees Celsius and 60 percent relative humidity for at least 24 hours prior to testing.

In its most general terms, a container according to the present invention is formed from a laminar blank and comprises a box and a lid hinged to the box. The lid comprises a first wall and a flap depending from the first wall along an edge fold line. The inner surface of the edge fold portion defines an ablation area (A) comprising one or more ablated zones having a residual thickness that is less than 50 percent of the thickness (T) of the laminar blank. In addition, the one or more ablated zones have a combined width of at least about 1.5 times the thickness (T) of the laminar blank.

Preferably, the one or more ablated zones have a combined width of at least about 2 times the thickness (T) of the laminar blank. More preferably, the one or more ablated zones have a combined width of at least about 3 times the thickness (T) of the laminar blank.

In addition, the one or more ablated zones preferably have a combined width of less than about 10 times the thickness (T) of the laminar blank. More preferably, the one or more ablated zones have a combined width of less than about 5 times the thickness (T) of the laminar blank. The Applicant has found that by forming ablated zones with a combined width falling within these ranges, the spring-back force of the laminar blank between the flap and first wall can be significantly reduced. This advantageously simplifies the manufacturing process, in that the folding and assembly of a container from blank can be made easier and more compatible with existing machinery. In addition, because the flap can be folded more easily, less adhesive may be needed to retain inner surface of the flap flush to the inner surface of the first wall in the assembled container. Further, because the blank is easier to fold into the desired form, it is less likely that the outer surface of the blank be damaged during the assembly of the container, and so the finish and appearance of the front of the container can be advantageously improved. In addition, the Applicant has found that by forming ablated zones with a combined width falling within the ranges provided above, the strength of the lid is not compromised and the overall energy consumption required for removing material from the blank is maintained at acceptable values.

Preferably, the width (W) of the ablation area is at least about 0.5 mm. In addition, or as an alternative, the width (W) of the ablation area is preferably less than about 2 mm. More preferably, the width (W) of the ablation area is preferably less than about 1.5 mm.

Preferably, each of the ablated zones has a residual thickness of less than about 30 percent of the thickness (T) of the laminar blank. More preferably, each of the ablated zones has a residual thickness of less than about 20 percent of the thickness (T) of the laminar blank. In addition, or as an alternative, each of the ablated zones preferably has a residual thickness of at least about 5 percent of the thickness (T) of the laminar blank. More preferably, each of the ablated zones preferably has a residual thickness of at least about 10 percent of the thickness (T) of the laminar blank. In some particularly preferred embodiments, each of the ablated zones has a residual thickness (RT1) of about 20 percent of the thickness (T) of the laminar blank. Surprisingly, the Applicant has found that it is possible to ablate material from the blank to such relatively high depths, without such ablation being visually detectable on the outside of the blank prior to assembly and, even more surprisingly, without substantially being visible/detectable on the outside of the container after assembly. This is particularly surprising for sections of the blank that have been folded by more than 90 degrees.

In some preferred embodiments, the ablation area comprises two or more ablation zones extending in parallel along a substantially straight line across the edge fold portion of the container. More preferably, the two or more ablation zones are provided as one or more score lines or grooves.

In some alternative embodiments, the ablation area preferably comprises a single ablation zone having a width of at least about 2 times the thickness (T) of the laminar blank. Preferably, the single ablation zone is provided as a score line or groove.

Preferably, the container has a spring-back force of less than about 80 grams per centimetre between the lid front wall and the lid flap.

Preferably, the lid flap is bonded to the inner surface of the first wall of the lid. By attaching the lid flap to the inner surface of the first wall of the lid, the strength of the lid may be increased.

Containers according to the present invention find application as containers for consumer goods, in particular elongate consumer goods such as smoking articles. However, they can also be used for several other types of consumer goods. Further, although throughout the specification reference is made, in particular, to a hinged-lid container wherein ablated zones are formed in the edge fold portion connecting a flap to the lid, it shall be appreciated that the same inventive concept may be applied to any container for consumer articles comprising a first wall and a second wall depending from the first wall along an edge fold portion, wherein the first wall is folded about the edge fold portion towards the inner surface of the second wall by an angle greater than 90 degrees.

The blank may be formed from any suitable material or combination of materials, including, but not limited to, cardboard, paperboard, plastic, metal, or combinations thereof. Preferably, the blank is a laminar cardboard blank having a weight of between about 100 grams per square metre and about 350 grams per square metre. In preferred embodiments, the blank has a thickness of from about 100 micrometres to about 500 micrometres, preferably from about 200 micrometres to about 350 micrometres.

The container may optionally comprise an outer wrapper, which is preferably a transparent polymeric film of, for example, high or low density polyethylene, polypropylene, oriented polypropylene, polyvinylidene chloride, cellulose film, or combinations thereof and the outer wrapper is applied in a conventional manner. The outer wrapper may include a tear tape. In addition, the outer wrapper may be printed with images, consumer information or other data.

Further, the consumer articles may be provided within the container in the form of a bundle wrapped in an inner package formed of metal foil or metallised paper. The inner package material may be formed as a laminate of a metallised polyethylene film, and a liner material. The liner material may be a super-calendered glassine paper. In addition, the inner package material may be provided with a print-receptive top coating. The inner package has an access opening through which consumer goods can be removed when a lid of the container is in a respective open position.

The container is preferably a rectangular parallelepiped comprising two wider walls spaced apart by two narrower walls. Hinge lid containers according to the invention may be in the shape of a rectangular parallelepiped, with right-angled longitudinal and right-angled transverse edges. Alternatively, the hinge lid container may comprise one or more rounded longitudinal edges, rounded transverse edges, bevelled longitudinal edges or bevelled transverse edges, or combinations thereof. For example, the hinge lid container according to the invention may comprise, without limitation:

- One or two longitudinal rounded edges on the front wall, and/or one or two longitudinal rounded or bevelled edges on the back wall.
- One or two transverse rounded edges on the front wall, and/or one or two transverse rounded or bevelled edges on the back wall.
- One longitudinal rounded edge and one longitudinal bevelled edge on the front wall, and/or one transverse rounded edge and one transverse bevelled edge on the back wall.
- One or two transverse rounded or bevelled edges on the front wall and one or two longitudinal rounded or bevelled edges on the front wall.
- Two longitudinal rounded or bevelled edges on a first side wall or two transverse rounded or bevelled edges on the second side wall.

Where the container comprises one or more bevelled edge, preferably the bevelled edge has a width of between about 1 mm and about 10 mm, preferably between about 2 and about 6 mm. Alternatively, the container may comprise a multi-bevelled edge formed by parallel creasing or scoring lines that are spaced such that two or more distinct bevels are formed on at least one edge of the container.

Alternatively, the container may have a non-rectangular transversal cross section, for example polygonal such as triangular or hexagonal, semi-oval or semi-circular.

Containers according to the invention find particular application as packs for elongate smoking articles such as, for example, cigarettes, cigars or cigarillos. It will be appreciated that through appropriate choices of the dimensions thereof, containers according to the invention may be designed for different numbers of conventional size, king size, super-king size, slim or super-slim cigarettes. Alternatively, other consumer goods may be housed inside the container.

Through an appropriate choice of the dimensions, containers according to the invention may be designed to hold different total numbers of smoking articles, or different arrangements of smoking articles. For example, through an appropriate choice of the dimensions, containers according to the invention may be designed to hold a total of between ten and thirty smoking articles.

The smoking articles may be arranged in different collations, depending on the total number of smoking articles.

Containers according to the present invention may hold smoking articles of the same type or brand, or of different types or brands. In addition, both filter-less smoking articles and smoking articles with various filter tips may be contained, as well as smoking articles of differing length (for example, between about 40 mm and about 180 mm), diameter (for example, between about 4 mm and about 9 mm). Preferably, the dimensions of the container are adapted to the length of the smoking articles, and the collation of the smoking articles. Typically, the outer dimensions of the container are between about 0.5 mm to about 5 mm larger than the dimensions of the bundle or bundles of smoking articles housed inside the container.

The length, width and depth of containers according to the invention may be such that the resultant overall dimensions of the container are similar to the dimensions of a typical disposable pack of twenty cigarettes.

Preferably, containers according to the invention have a height of between about 60 mm and about 150 mm, more preferably a height of between about 70 mm and about 125 mm, wherein the height is measured from the bottom wall to the top wall of the container.

Preferably, containers according to the invention have a width of between about 12 mm and about 150 mm, more preferably a width of between about 70 mm and about 125 mm, wherein the width is measured from one side wall to the other side wall of the container.

Preferably, containers according to the invention have a depth of between about 6 mm and about 150 mm, more preferably a depth of between about 12 mm and about 25 mm wherein the depth is measured from the front wall to the back wall of the container.

Preferably, the ratio of the height of the container to the depth of the container is in between about 0.3 to 1 and about 10 to 1, more preferably between about 2 to 1 and about 8 to 1, most preferably between about 3 to 1 and 5 to 1

Preferably, the ratio of the width of the container to the depth of the container is in between about 0.3 to 1 and about 10 to 1, more preferably between about 2 to 1 and about 8 to 1, most preferably between about 2 to 1 and 3 to 1.

Preferably, the ratio of the height of the lid back wall to the height of the box back wall of the outer sleeve is between about 0 to 1 (lid located at the top edge of the container) to about 1 to 1, more preferably, between about 1 to 5 and about 1 to 10, most preferably, between about 1 to 6 to about 1 to 8.

The exterior surfaces of containers according to the invention may be printed, embossed, debossed or otherwise embellished with manufacturer or brand logos, trade marks, slogans and other consumer information and indicia.

Containers according to the invention may be filled and assembled using conventional apparatus and methods, modified to include the step of forming the ablated zones in the blank. The ablated zones may be produced using an ablation tool, such as a laser or a blade. A laser is particularly preferred as the ablation tool as it can allow for a wide variety of ablation profiles and configurations, with minimal adjustment of the laser tool being needed. For example, the laser may be repeatedly passed over a given portion of the blank to iteratively remove different amounts of material, allowing for a very finely controlled ablation profile. This is particularly beneficial if the ablation zone is to have a wide profile, such as one more than about 3 mm wide. It is also beneficial if fine ablated zones are required, with narrow widths. It is possible to accurately control the relative movement of the laser and the blank so as to form any type of pattern with varying removal intensity ("depth") over the ablation area.

The invention will be further described, by way of example only, with reference to the accompanying drawings in which.

Figure 1:
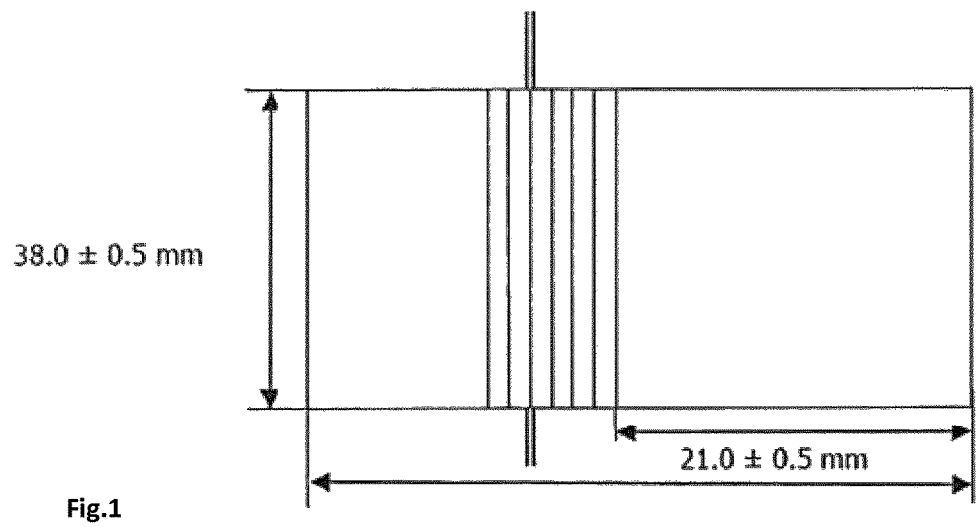
FIG. 1 depicts a sample portion of a laminar blank for use in determining the spring-back force of the blank.
Figure 2:
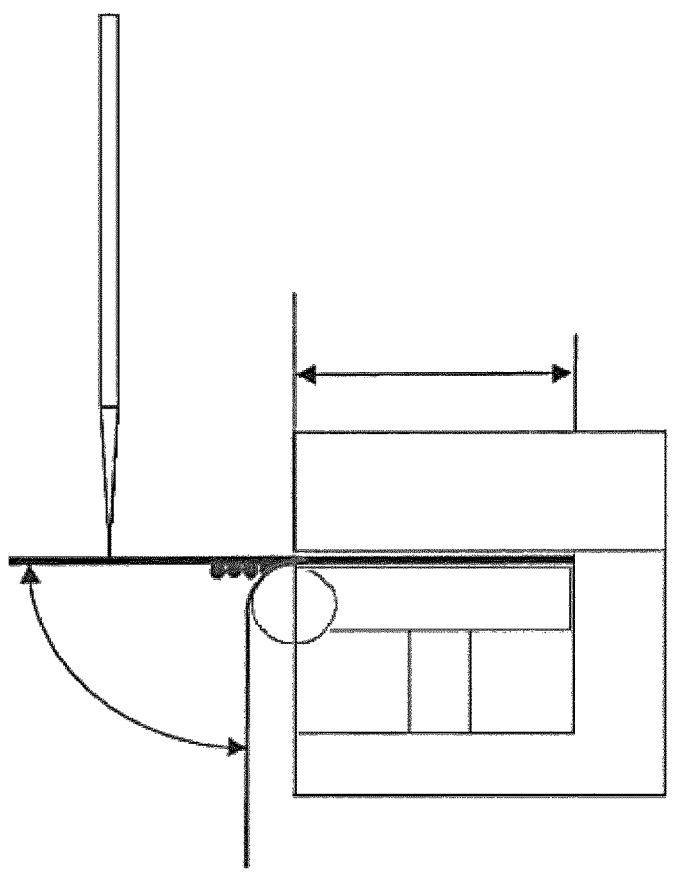
FIG. 2 depicts an apparatus for determining the spring-back force of a blank.
Figure 3:
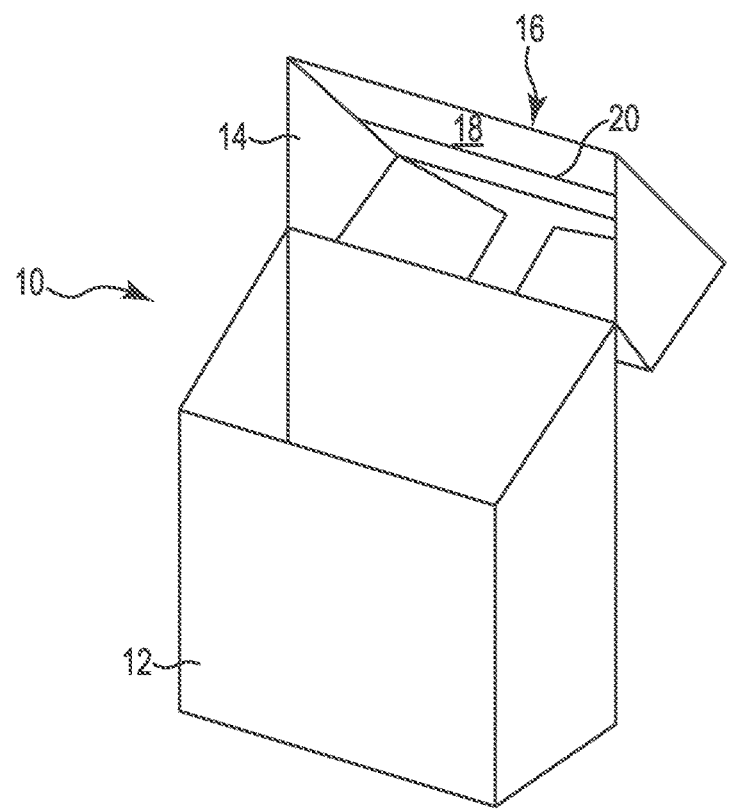
FIG. 3 shows a schematic perspective view of a container according to the present invention.

The container 10 shown in FIG. 3 is a rectangular parallelepiped and comprises a box 12 and a hinge lid 14 connected to the box 12 along a hinge line and pivotable about the hinge line between a closed position and an open position. The hinge lid 14 comprises a lid front wall 16 and a lid flap 18 depending from the lid front wall 16 along an edge fold line 20.

The container is assembled from a laminar blank having a thickness T and defining an edge fold portion 22 of the container connecting the lid front wall 16 and the lid flap 18. When the container 10 is assembled from the blank, the lid flap 16 is folded inward towards the inner surface of the lid front wall 16 and bonded, e.g. by means of an adhesive, to the inner surface of the first wall of the lid. This increases the strength of the lid. This also provides an improved appearance to the lower edge of the lid front wall.

As shall be described in more detail with reference to the drawings of FIGS. 4 and 5, the inner surface of the edge fold portion 22 defining an ablation area A having a length in the longitudinal direction of the edge fold portion 22 and a width W extending transversely to said length. The ablation area A comprises one or more ablated zones having a residual thickness that is less than the thickness T of the laminar blank. Further, the one or more ablated zones have a residual thickness of about 20 percent of the thickness (T) of the laminar blank. As shall be described in more detail with reference to the Examples below, the one or more ablated zones have a combined width of more than 1.5 times the thickness (T) of the laminar blank.

EXAMPLE 1

Figures 4, 5, 6:
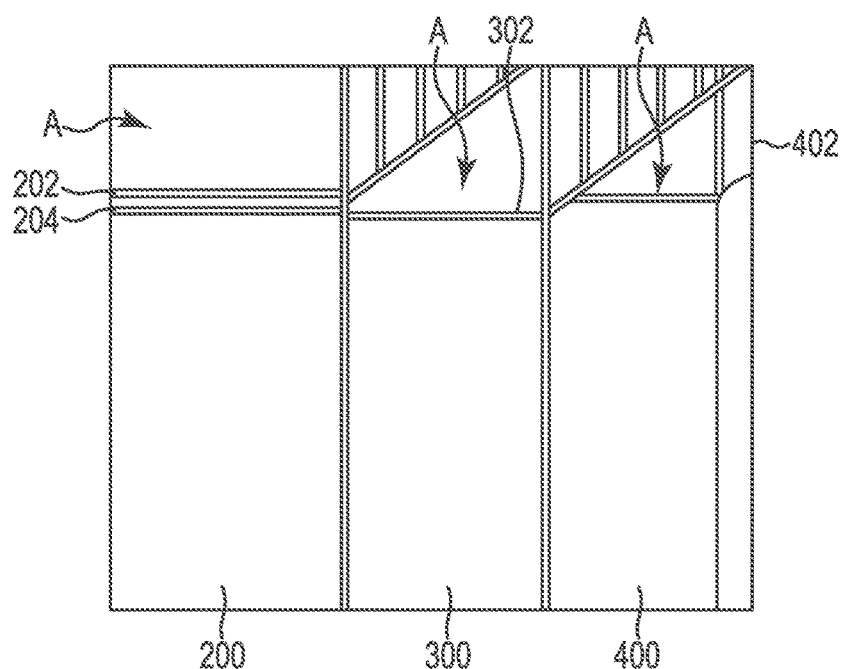
FIGS. 4-6 are line drawings of blanks for forming a container according to a first embodiment of the present invention Example 1); according to a second embodiment of the present invention (Example 2); and according to a Comparative Example.

A first embodiment of the laminar blank 200 according to the present invention is depicted in FIG. 4. As illustrated therein, the ablation area A comprises two ablation zones 202, 204 extending in parallel along a substantially straight line across the portion of the blank 200 for forming the edge fold portion 22 in a container. The two ablated zones 202, 204 have a combined width of about 0.7 millimetres. Each ablated zone has a width of 0.35 millimetres. The ablation zone A has a width of 0.9 millimetres. Thus, there is a gap of about 0.2 millimetres between the two ablated zones 202, 204.

When a container 10 was formed from the laminar blank 200, a spring-back force of about 39 grams per centimetre was measured between the lid front wall and the lid flap.

EXAMPLE 2

A second embodiment of the laminar blank 300 according to the present invention is depicted in FIG. 4. As illustrated therein, the ablation area A comprises a single ablation zone 302 extending along a substantially straight line across the portion of the blank 300 for forming the edge fold portion 22 in a container. The single ablated zone 302 has a width of about 0.5 millimetres. Thus, the ablation zone also has a width of about 0.5 millimetres.

When a container 10 was formed from the laminar blank 300, a spring-back force of about 73 grams per centimetre was measured between the lid front wall and the lid flap.

COMPARATIVE EXAMPLE 1

A first reference laminar blank 400 is depicted in FIG. 5. As illustrated therein, the ablation area A comprises a single ablation zone 402 extending along a substantially straight line across the portion of the blank 400 for forming the edge fold portion 22 in a container. The single ablated zone 402 has a width of about 0.1 millimetres. Thus, the ablation zone also has a width of about 0.1 millimetres.

When a container 10 was formed from the laminar blank 400, a spring-back force of about 113 grams per centimetre was measured between the lid front wall and the lid flap.

COMPARATIVE EXAMPLE 2

A second reference laminar blank (not illustrated) has also been prepared and tested. The blank second reference laminar included a single conventional creasing line extending along a substantially straight line across the portion of the blank for forming the edge fold portion in a container. The creasing line has been formed by conventional machinery that mechanically deforms a portion of the blank.

When a container was formed from the second reference laminar blank, a spring-back force of about 40 grams per centimetre was measured between the lid front wall and the lid flap.

Thus, it shall be appreciated that in blanks and containers according to the present invention, the force necessary when assembling the container for folding the lid flap inwards and towards the inner surface of the lid front wall can be advantageously reduced. It can also be appreciated that for blanks and containers according to the present invention, this force can be advantageously reduced to a value that is comparable to the value for conventional creasing folds, and thus can be reduced to a value that is more likely to be compatible with existing machinery.

The invention claimed is:

1. A container for consumer articles comprising a first wall and a second wall depending from the first wall along an edge fold portion, the first wall being folded about the edge fold portion towards the inner surface of the second wall by an angle greater than 90 degrees, wherein the first wall is a lid front wall of the container and the second wall is a lid flap depending from the first lid wall along an edge fold line;

wherein the container is at least partially formed from a laminar blank having a thickness (T), the laminar blank defining an edge fold portion of the container hingedly connecting the wall and the flap;

the inner surface of the edge fold portion defining an ablation area (A) having a length in the longitudinal direction of the edge fold portion and a width (W) extending transversely to said length;

wherein the ablation area (A) comprises two or more ablated zones having a residual thickness that is less than 50 percent of the thickness (T) of the laminar blank, wherein the two or more ablated zones extend in parallel along a substantially straight line across the edge fold portion of the container and wherein the two or more ablated zones have a combined width of at least 1.5 times the thickness (T) of the laminar blank;

wherein the width (W) of the ablation area is at least 0.5 mm; and wherein the container has a spring-back force of less than 80 grams per centimeter between the lid front wall and the lid flap.

2. A container according to claim 1, wherein the width (W) of the ablation area is less than 2 mm.

3. A container for consumer articles comprising a first wall and a second wall depending from the first wall along an edge fold portion, the first wall being folded about the edge fold portion towards the inner surface of the second wall by an angle greater than 90 degrees, wherein the first wall is a lid front wall of the container and the second wall is a lid flap depending from the first lid wall along an edge fold line;

wherein the container is at least partially formed from a laminar blank having a thickness (T), the laminar blank defining an edge fold portion of the container hingedly connecting the wall and the flap;

the inner surface of the edge fold portion defining an ablation area (A) having a length in the longitudinal direction of the edge fold portion and a width (W) extending transversely to said length;

wherein the ablation area (A) comprises two or more ablated zones having a residual thickness that is less than 50 percent of the thickness (T) of the laminar blank, wherein the two or more ablated zones extend in parallel along a substantially straight line across the edge fold portion of the container and wherein the two or more ablated zones have a combined width of at least 1.5 times the thickness (T) of the laminar blank;

wherein the width (W) of the ablation area is less than 2 mm; and wherein the container has a spring-back force of less than 80 grams per centimeter between the lid front wall and the lid flap.

* * * * *